United States Patent
Chen et al.

(10) Patent No.: US 8,611,612 B2
(45) Date of Patent: Dec. 17, 2013

(54) BLOCK MATCHING METHOD

(75) Inventors: Tsui-Chin Chen, Hsinchu (TW);
Yu-Shu Liu, Hsinchu (TW); Wan-Hsi Hsieh, Taoyuan County (TW);
Yu-Tsung Hu, Changhua County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 0 days.

(21) Appl. No.: 13/272,223

(22) Filed: Oct. 13, 2011

(65) Prior Publication Data
US 2012/0224749 A1 Sep. 6, 2012

(30) Foreign Application Priority Data
Mar. 1, 2011 (TW) .............................. 100106644 A

(51) Int. Cl.
*G06K 9/00* (2006.01)
(52) U.S. Cl.
USPC ........................................................ 382/107
(58) Field of Classification Search
None
See application file for complete search history.

(56) References Cited

U.S. PATENT DOCUMENTS

| | | | | |
|---|---|---|---|---|
| 5,274,453 | A | * | 12/1993 | Maeda ........................... 348/584 |
| 2002/0075959 | A1 | * | 6/2002 | Dantwala .................. 375/240.16 |
| 2005/0025244 | A1 | * | 2/2005 | Lee et al. .................. 375/240.16 |

FOREIGN PATENT DOCUMENTS

TW 200845766 11/2008

OTHER PUBLICATIONS

Hsieh, C-H., and T-P. Lin. "VLSI architecture for block-matching motion estimation algorithm." Circuits and Systems for Video Technology, IEEE Transactions on 2.2 (1992): 169-175.*

* cited by examiner

*Primary Examiner* — Stephen R Koziol
*Assistant Examiner* — Amandeep Saini
(74) *Attorney, Agent, or Firm* — Winston Hsu; Scott Margo

(57) ABSTRACT

A block matching method for estimating a motion vector of an estimation block of an image frame is provided, which includes comparing the estimation block with at least one reference block corresponding to a first object to obtain a plurality of pixel difference values, determining a mask area corresponding to the first object and a calculation area corresponding to a second object in the estimation block, and performing blocking matching operations on the calculation area to determine a motion vector of the second object as the motion vector of the estimation block.

8 Claims, 3 Drawing Sheets

BLOCK MATCHING METHOD

BACKGROUND OF THE INVENTION

1. Field of the Invention

The invention relates to a block matching method, and more particularly, to a block matching method capable of correctly determining a motion vector by utilizing a mask area to filter out interference from other objects.

2. Description of the Prior Art

Motion estimation is an important technique used in video compression, its objective being to reduce redundant information from video frames at various time points. Generally, a video achieves an illusion of motion through playback of a series of still images differentiated by subtle variations between two consecutive frames, as a result of persistence of human vision. Moreover, images in two adjacent frames are usually almost identical, distinguished by only slight or even no variation. In such a case, it is unnecessary to store unchanging parts of an image, and only necessary to make slight modifications to previous images. In short, during video encoding/decoding, a subsequent frame may be reconstructed from a previous frame using information recorded during motion. As such, it is unnecessary to store all frames, thus effectively reducing an amount of transmitted information, and thereby achieving video compression. Motion estimation techniques aim to record certain information during image motion, e.g. a motion vector, so as to obtain subsequent image via motion compensation.

Block matching is one of the most common motion estimation methods, which divides an image frame into multiple non-overlapping blocks to identify the most similar parts between the blocks at different times, and to obtain a motion vector between the blocks. Generally, it is possible for multiple objects to be present in each block. In other words, at a particular time, a block may be positioned at an intersection between the multiple objects. Please refer to FIG. 1, which is a schematic diagram of different objects being present in a same block according to the prior art. As shown in FIG. 1, an image frame F is divided into n blocks. At a time T1, a block MBx (one of blocks MB1-MBn) only contains an object Obj_A, and at a time T2, the block MBx contains another object Obj_B apart from the object Obj_A. For the block MBx, a corresponding motion vector is often calculated employing a motion vector mv_A corresponding to the object Obj_A and a motion vector mv_B corresponding to the object Obj_B. In such a case, a resultant motion vector is often prone to errors, due to a mixed presence of different (or greatly varying) object motions within the same block. Therefore, an actual moving direction of the objects in the image cannot be correctly determined.

SUMMARY OF THE INVENTION

Therefore, a primary objective of the present invention is to provide a block matching method capable of correctly estimating a motion vector through using a mask area to filter out interference from different objects.

An embodiment discloses a block matching method for estimating a motion vector of an estimation block of an image frame. The method comprises comparing the estimation block with at least one reference block corresponding to a first object to obtain a plurality of pixel difference values; determining a mask area corresponding to the first object and a calculation area corresponding to a second object in the estimation block according to the plurality of pixel difference values; and performing block matching operations on the calculation area to determine a motion vector of the second object to as the motion vector of the estimation block.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
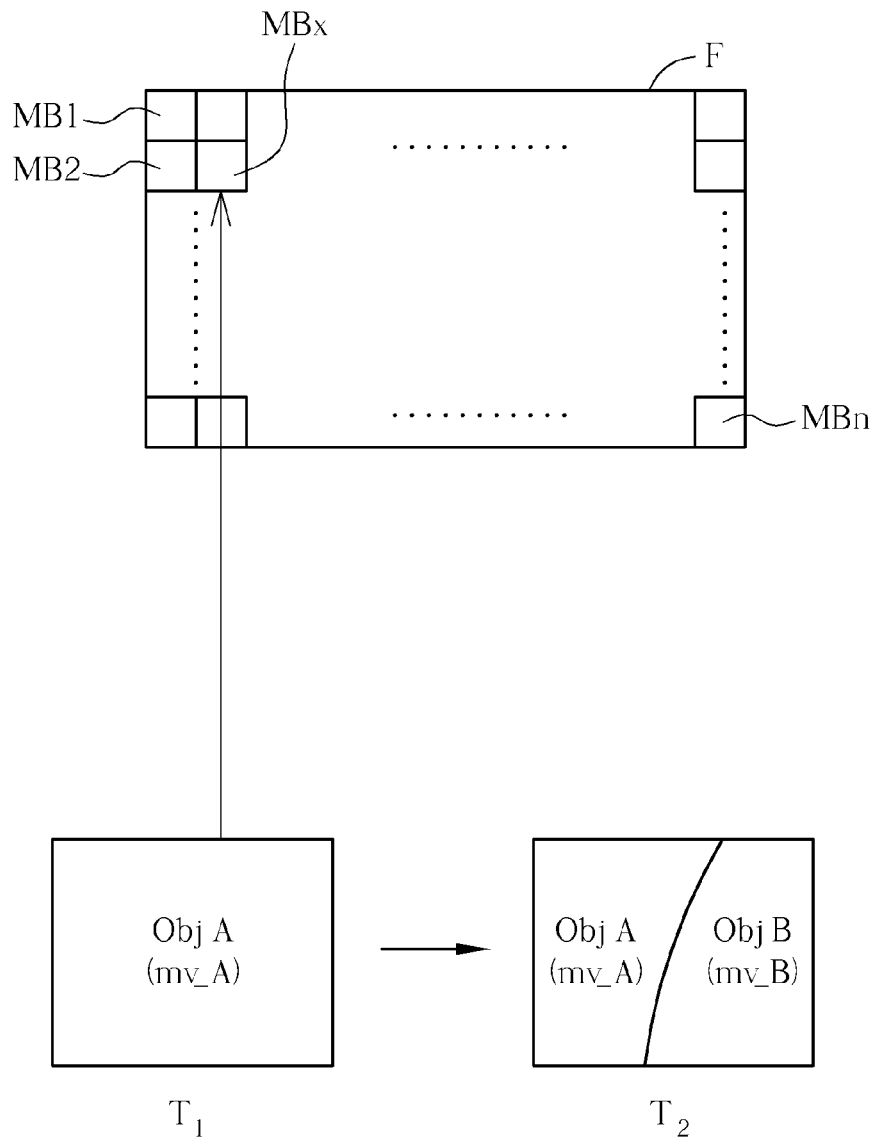
FIG. 1 is a schematic diagram of a same block containing different objects according to the prior art.
Figure 2:
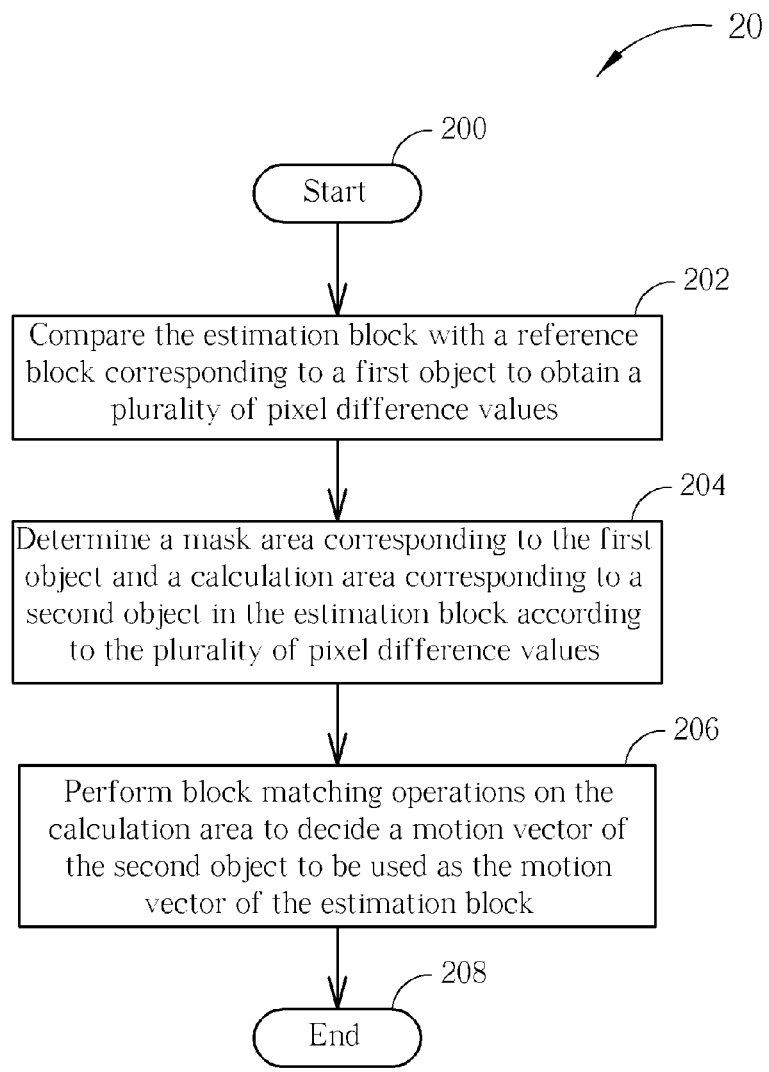
FIG. 2 is a schematic diagram of a block matching process according to an embodiment.

Please refer to FIG. 2, which is a schematic diagram of a block matching process 20 according to an embodiment. The block matching process 20 is used for estimating a motion vector of an estimation block of an image frame. The process 20 includes the following steps:

Step 200: Start.

Step 202: Compare the estimation block with a reference block corresponding to a first object to obtain a plurality of pixel difference values.

Step 204: Determine a mask area corresponding to the first object and a calculation area corresponding to a second object in the estimation block according to the plurality of pixel difference values.

Step 206: Perform block matching operations on the calculation area to decide a motion vector of the second object to be used as the motion vector of the estimation block.

Step 208: End.

According to the process 20, motion estimation attempts to determine a motion vector required for a decoding process during an image encoding process. Therefore, during the motion estimation, block matching is performed on inputted image frames to identify similar image blocks, so as to obtain a corresponding motion vector. In Step 202, it is possible to utilize information obtained from a previous image frame to perform corresponding subsequent block matching operations, so as to determine image frame differences between different times. For example, please refer to FIGS. 3 and 4, which are schematic diagrams of an object in motion. Image frames F1 and F2 are two consecutive image frames in an image sequence of an input video, each having n image blocks. Suppose that a first object Obj_A is a stationary background image, and that a second object Obj_B is a moving round object. As shown by the image frame F1 in FIG. 3, the image block MB1 only contains the first object Obj_A, whereas in the image frame F2 shown in FIG. 4, the second object Obj_B has moved to the image block MB1, and the round object is partially inside a range of the image block MB1. Namely, in the image frame F2, the image block MB1 concurrently intersects the two objects, and is located on a boundary between the first object Obj_A and the second object Obj_B.

Therefore, in Step 202, pixel difference values between each pixel in the estimation block and its corresponding pixel in a reference block are calculated according to the reference block corresponding to the first object Obj_A. For example, suppose that the image frame F2 shown in FIG. 4 is a frame currently undergoing motion estimation, and that the image block MB1 of the image frame F2 is the estimation block pending motion vector calculation, then it is possible to arrange the image block MB1 of the image frame F1 shown in FIG. 3 as the reference block. Next, using this reference block (i.e. the image block MB1 in the image frame F1), it is possible to compare pixel values of each pixel in the estimation block (i.e. the image block MB1 in the image frame F2) with corresponding pixel values in the reference block (i.e. the image block MB1 in the image frame F1) to obtain pixel difference values between the two blocks. Simply, pixel difference values may represent a degree of difference between each pixel in the estimation block and the reference block.

In a different embodiment of Step 202, the pixel difference values may be brightness or chroma (saturation) difference values. More specifically, it is possible to subtract brightness (or chroma) values of each pixel in the image block MB1 of the image frame F2 from corresponding pixel brightness (or chroma) values in the image block MB1 of the image frame F1, to obtain pixel difference values between the two blocks, respectively.

After calculating the pixel difference values, Step 204 may be performed to set a pixel area corresponding to the first object Obj_A as a mask area M, and set a pixel area corresponding to the second object Obj_B as a calculation area C, according to the calculated pixel difference values. As mentioned above, the pixel difference values calculated in Step 202 reflect a degree of difference between pixels in the estimation block and the reference block, and the reference block is selected from an image block of the preceding image frame; therefore, for each pixel in the estimation block, when the pixel difference value is small, it represents that an object displayed at this pixel position should be the same object as that displayed in the reference block. Conversely, when the pixel difference value is large, it represents that the object displayed at this pixel position should be a different object from that displayed in the reference block. As such, it is possible to determine an area having a large overall degree of difference in the estimation block as the pixel area of the first object Obj_A, i.e. the mask area M. Conversely, an area having a small overall degree of difference in the estimation block may be determined to be the pixel area of the second object Obj_B, i.e. the calculation area C.

According to an embodiment, in Step 204, it is possible to analyze a similarity distribution of the pixel difference values of each pixel in the estimation block according to the calculated pixel difference values, to determine whether there exists at least one area with pixels all having similar pixel difference values. The at least one area may be henceforth referred to as a high-similarity area, and may be determined as one of the mask area M and the calculation area C, respectively.

More specifically, if there exists an area in the estimation block with at least one pixel all having adjacent pixel difference values smaller than a first threshold value, it is possible to set the area formed by the adjacent pixels as the mask area M. Conversely, when there exists an area in the estimation block with at least one pixel all having adjacent pixel difference values greater than a second threshold value, it is possible to set the area formed by the adjacent pixels as the calculation area C. Preferably, the second threshold value is equal to the first threshold value, but may also be not equal to the first threshold value. For example, please refer to FIG. 5, which is a schematic diagram of a configuration of the image block MB1 of the image frame F2 shown in FIG. 4. As shown in FIG. 5, since the image block MB1 in the image frame F1 is used as the reference block, the pixel area of the first object Obj_A has small pixel difference values (e.g. all smaller than the first threshold value), and this area may be set as the mask area M. The pixel area of the second object Obj_B have greater pixel difference values (e.g. all greater than the second threshold value), and thus may be set as the calculation area C.

Next, in Step 206, it is possible to perform block matching operations on the calculation area C individually, to decide a motion vector of the second object. To accurately obtain the motion vector of another object (the second object Obj_B in FIGS. 3 and 4) on a boundary of the current frame, it is only necessary to perform operations on pixels within the calculation area C, and neglect pixels in the mask area M of the estimation block, since a motion vector of the object related to the reference block (i.e. the first object Obj_A in FIGS. 3 and 4) has already been correctly obtained in a previous operation. In other words, via setting the mask area M, it is possible to filter out possible interruptions that might affect a correct determination of the motion vector of the second object Obj_B (in this case, the image of the first object Obj_A), such that a correct motion vector of the second object Obj_B may be obtained.

Currently, various motion vector calculation methods may be used to perform Step 206. For example, operations such as sum of absolute difference (SAD), mean square error (MSE), or mean absolute error (MAE) may be performed on each pixel of the calculation area C to determine the motion vector of the second object.

In summary of the above, it is possible to effectively eliminate interference from the first object Obj_A and accurately obtain the motion vector of the second object Obj_B, by first calculating pixel difference values between pixels in the estimation block and corresponding pixels in the reference block in Step 202, then by determining the mask area M and the calculation area C according to the pixel difference values via step 204, and finally by calculating the motion vector of the second object in the estimation block based on pixels in the calculation area C in Step 206.

Figure 3:
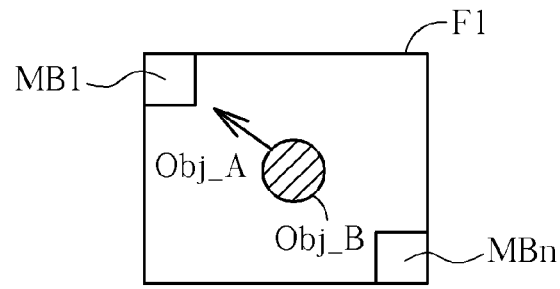
FIGS. 3 and 4 are schematic diagrams of an object in motion.
Figure 4:
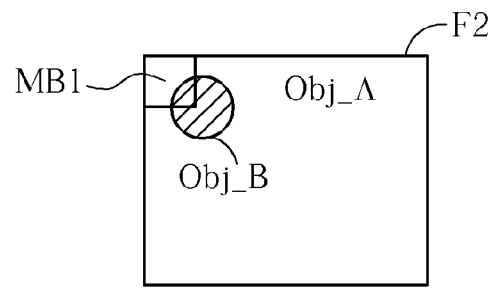
Figure 5:
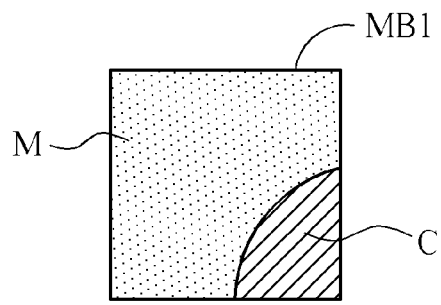
FIG. 5 is a schematic diagram of a configuration of blocks in an image block of an image frame shown in FIG. 4.

Note that, the embodiment shown in FIGS. 3 and 4 illustrates using an image block on an intersection of two objects as an example, but this is not limited thereto, and may be generalized to another embodiment having an image block on an intersection of two or more objects, and is not further described herein. Moreover, the image block is not limited to any size, depending on system design or practical requirements, e.g. the image blocks may be 16×16, 32×32 pixels, but not limited thereto.

Moreover, note that in Step 202 of the embodiment shown in FIGS. 3 and 4, when selecting the reference block to calculate pixel difference values, the reference block is selected to be a block at a same position in the preceding image frame. However, this is not limited thereto. The reference block may be arranged to be blocks at the same or similar positions in several previous image frame, namely, a plurality of reference blocks may be arranged. In such a case, it is possible to compare an average pixel value of the plurality of reference blocks with the corresponding pixel values in the estimation block to obtain the above-mentioned pixel difference values.

Moreover, it should be noted that in the embodiment shown in FIGS. 3 and 4, in Step 204, several different methods of determining the mask area M and the calculation area C are possible. For instance, in the above-mentioned embodiment, both the mask area M and the calculation area C have to be determined by deciding whether the pixel difference values of both areas satisfy certain requirements. However, in other embodiments, it is possible to only determine one of the areas.

More specifically, it is possible to calculate the motion vector by only determining the mask area M (an area having all adjacent pixel difference values smaller than the second threshold value), while determining an remaining area within the image block MB1 as the calculation area C. Conversely, it is possible to only determine the calculation area C (e.g. an area having all adjacent pixel difference values greater than the first threshold value), and excluding the remaining area within the image block MB1 as the mask area M. Moreover, it is possible to determine an area in the estimation block having a larger overall degree of difference with the reference block as the mask area M, and/or to determine an area with smaller overall degree of difference as the calculation area C, etc.

In summary, at intersections of objects in an image frame, the above-mentioned embodiment is capable of obtaining an accurate motion vector for an object during motion vector estimation calculations for the object, via masking and excluding another object, thereby filtering out interference between the two objects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A block matching method for estimating a motion vector of an estimation block of an image frame, comprising:
   comparing the estimation block with at least one reference block corresponding to a first object to obtain a plurality of pixel difference values;
   determining a mask area corresponding to the first object and a calculation area corresponding to a second object in the estimation block according to the plurality of pixel difference values; and
   performing block matching operations on the calculation area to determine a motion vector of the second object to be used as the motion vector of the estimation block.

2. The block matching method of claim 1, wherein the at least one reference block is an image block in one or more previous image frames, respectively.

3. The block matching method of claim 1, wherein the plurality of pixel difference values are pixel difference values between a plurality of pixels of the estimation block and corresponding pixels of the at least one reference block.

4. The block matching method of claim 1, wherein the plurality of pixel difference values are selected from brightness difference values or chroma difference values.

5. The block matching method of claim 1, wherein the step of determining the mask area corresponding to the first object and the calculation area corresponding to the second object in the estimation block according to the plurality of pixel difference values comprises:
   analyzing a similarity distribution of the pixel difference values in the estimation block to obtain at least one high-similarity area;
   determining the at least one high-similarity area as the mask area or the calculation area, respectively.

6. The block matching method of claim 5, wherein all pixel difference values of pixels in each of the at least one high-similarity area are smaller than a first threshold value or all greater than a second threshold value.

7. The block matching method of claim 6, wherein the steps of determining the at least one high-similarity area as one of the mask area or the calculation area, respectively, comprise at least one of:
   determining the high-similarity area having all pixel difference values smaller than the first threshold value as the mask area; and
   determining the high-similarity area having all pixel difference values greater than the second threshold value as the calculation area.

8. The block matching method of claim 1, wherein the block matching operations comprise:
   performing a sum of absolute difference (SAD) operation, a mean square error (MSE) operation, or a mean absolute error (MAE) operation on each pixel in the calculation area.

* * * * *